United States Patent
Degura et al.

(10) Patent No.: US 9,438,058 B2
(45) Date of Patent: Sep. 6, 2016

(54) ELECTRONIC DEVICE

(71) Applicant: CANON KABUSHIKI KAISHA, Tokyo (JP)

(72) Inventors: Yasusaburo Degura, Tokyo (JP); Yasuhiro Sato, Kawasaki (JP); Naoki Shimma, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 84 days.

(21) Appl. No.: 14/141,180

(22) Filed: Dec. 26, 2013

(65) Prior Publication Data

US 2014/0184897 A1   Jul. 3, 2014

(30) Foreign Application Priority Data

Dec. 28, 2012   (JP) .................. 2012-287730

(51) Int. Cl.
  *H02J 7/00* (2006.01)
  *H04N 5/232* (2006.01)
  *G06F 1/26* (2006.01)

(52) U.S. Cl.
  CPC ............ *H02J 7/0068* (2013.01); *G06F 1/263* (2013.01); *H04N 5/23241* (2013.01); *H02J 2007/0062* (2013.01); *H02J 2007/0095* (2013.01)

(58) Field of Classification Search
  None
  See application file for complete search history.

(56) References Cited

U.S. PATENT DOCUMENTS

| | | | | |
|---|---|---|---|---|
| 7,518,343 B2 | 4/2009 | Veselic et al. | | |
| 7,523,338 B2* | 4/2009 | Fu | ............ | G06F 1/266 713/300 |
| 7,631,111 B2* | 12/2009 | Monks | ............ | H04L 12/10 710/15 |
| 7,631,203 B2 | 12/2009 | Irie | | |
| 7,688,037 B2* | 3/2010 | Huh | ............ | H02J 7/0072 320/112 |
| 7,734,317 B2* | 6/2010 | Patel | ............ | H02J 7/0013 320/129 |
| 7,834,581 B2* | 11/2010 | Kim | ............ | H01M 10/44 320/103 |
| 7,882,297 B2* | 2/2011 | Sisto | ............ | G06F 1/266 710/306 |
| 8,350,522 B2* | 1/2013 | Johnson | ............ | G06F 1/266 320/107 |
| 8,700,934 B2* | 4/2014 | Book | ............ | G06F 9/4401 710/305 |
| 9,030,166 B2* | 5/2015 | Kano | ............ | G06F 1/266 320/107 |
| 9,214,824 B2* | 12/2015 | Masumoto | ............ | H02J 7/0052 |
| 2001/0003205 A1 | 6/2001 | Gilbert | | |
| 2003/0052547 A1* | 3/2003 | Fischer | ............ | H01R 13/6675 307/154 |
| 2003/0054703 A1* | 3/2003 | Fischer | ............ | H02J 7/0027 439/894 |

(Continued)

FOREIGN PATENT DOCUMENTS

| | | |
|---|---|---|
| JP | 2007-20398 A | 1/2007 |
| JP | 2007-68333 A | 3/2007 |
| WO | 2005/078554 A1 | 8/2005 |

*Primary Examiner* — Michael Osinski (74) *Attorney, Agent, or Firm* — Canon U.S.A., Inc., IP Division (57) ABSTRACT

An electronic device includes a communication control unit configured to perform an enumeration process, and a charging unit configured to charge a battery unit with power supplied from an external device. If a voltage of the battery unit is higher than a predetermined voltage, the communication control unit allows to perform the enumeration process with power supplied from the battery unit.

20 Claims, 5 Drawing Sheets

(56) References Cited

U.S. PATENT DOCUMENTS

| | | | |
|---|---|---|---|
| 2003/0076440 A1 | 4/2003 | Terane | |
| 2003/0110403 A1 | 6/2003 | Crutchfield | |
| 2004/0239294 A1 | 12/2004 | Veselic et al. | |
| 2004/0251878 A1* | 12/2004 | Veselic | H02J 7/00 320/141 |
| 2005/0144495 A1 | 6/2005 | Nakajima | |
| 2005/0189909 A1* | 9/2005 | Guthrie | G06F 1/263 320/107 |
| 2006/0015757 A1 | 1/2006 | Tupman | |
| 2006/0181241 A1* | 8/2006 | Veselic | G06F 1/266 320/107 |
| 2006/0287007 A1* | 12/2006 | Veselic | H04B 1/1607 455/572 |
| 2007/0046268 A1 | 3/2007 | Irie | |
| 2007/0088967 A1 | 4/2007 | Fu | |
| 2007/0143505 A1* | 6/2007 | Terrell | G06F 1/266 710/10 |
| 2008/0042616 A1 | 2/2008 | Monks | |
| 2008/0106232 A1* | 5/2008 | Idzik | H01M 10/44 320/103 |
| 2009/0001927 A1* | 1/2009 | Stamos | H02J 7/0072 320/106 |
| 2010/0201308 A1* | 8/2010 | Lindholm | G06F 1/26 320/107 |
| 2010/0217911 A1* | 8/2010 | Sisto | G06F 1/266 710/303 |
| 2010/0301673 A1 | 12/2010 | Riedel | |
| 2011/0001454 A1* | 1/2011 | Kano | G06F 1/266 320/107 |
| 2011/0188675 A1* | 8/2011 | Shimoharada | 381/120 |
| 2011/0205678 A1* | 8/2011 | Baba | H02J 7/0031 361/86 |
| 2012/0011376 A1 | 1/2012 | Zai | |
| 2012/0078551 A1* | 3/2012 | Li | H02J 7/0047 702/63 |
| 2012/0268068 A1* | 10/2012 | Jung | H01M 10/44 320/109 |
| 2012/0293117 A1* | 11/2012 | Suzuki | H02J 7/0006 320/108 |
| 2013/0049680 A1* | 2/2013 | Katsumata | H01M 2/34 320/107 |
| 2013/0166928 A1* | 6/2013 | Yang | G06F 1/266 713/300 |
| 2014/0141845 A1* | 5/2014 | Li | H02J 7/0027 455/573 |
| 2014/0184897 A1* | 7/2014 | Degura | H02J 7/0068 348/372 |

\* cited by examiner

ELECTRONIC DEVICE

BACKGROUND

1. Field of the Invention

The present invention relates to an electronic device capable of performing an enumeration process with power supplied from a battery unit, for example.

2. Description of the Related Art

A USB device, that is an electronic device based on a Universal Serial Bus (USB) standard, is capable of receiving power from an external device via a USB cable. Japanese Patent Laid-Open Nos. 2007-20398 and 2007-68333 disclose a USB device capable of receiving power from an external device via a USB cable.

Performing an enumeration process between a USB device and an external device allows notification to the external device of what kind of device the USB device is. Japanese Patent Laid-Open No. 2007-20398 discloses a USB device which performs an enumeration process based on the USB standard with power received from an external device via a USB cable.

However, the amount of power supplied from an external device to a USB device disadvantageously depends on the capability of the external device. In this case, a lower capability of an external device may not provide power supply enough for performing an enumeration process, which may prevent start of the enumeration process.

The amount of power supplied from an external device to a USB device may vary in accordance with a load state of the external device. This may cause another problem that an enumeration process may possibly end in the middle for some load states of the external device.

SUMMARY OF THE EMBODIMENTS

According to an aspect of the following embodiments, at least one of the above-described drawbacks and disadvantages can be overcome.

According to another aspect of the following embodiments, power supplied from a battery unit may be used to perform an enumeration process.

According to another aspect of the following embodiments, there is provided an electronic device including: a communication control unit configured to perform an enumeration process; and a charging unit configured to charge a battery unit with power supplied from an external device, wherein if a voltage of the battery unit is higher than a predetermined voltage, the communication control unit allows to perform the enumeration process with power supplied from the battery unit.

According to another aspect of the following embodiments, there is provided a method including: charging a battery unit with power supplied from an external device; and allowing a communication control unit of an electronic device to perform an enumeration process with power supplied from the battery unit if a voltage of the battery unit is higher than a predetermined voltage.

According to another aspect of the following embodiments, there is provided a non-transitory computer-readable storage medium that stores a program causing a computer to perform a method. The method includes: charging a battery unit with power supplied from an external device; and allowing a communication control unit of an electronic device to perform an enumeration process with power supplied from the battery unit if a voltage of the battery unit is higher than a predetermined voltage.

According to another aspect of the following embodiments, there is provided an electronic device including: a communication control unit configured to perform an enumeration process; and a charging unit configured to charge a battery unit with power supplied from an external device, wherein if a remaining amount of the battery unit is higher than a predetermined amount, the communication control unit allows to perform the enumeration process with power supplied from the battery unit.

According to another aspect of the following embodiments, there is provided a method including: charging a battery unit with power supplied from an external device; and allowing a communication control unit of an electronic device to perform an enumeration process with power supplied from the battery unit if a remaining amount of the battery unit is higher than a predetermined amount.

According to another aspect of the following embodiments, there is provided a non-transitory computer-readable storage medium that stores a program causing a computer to perform a method. The method includes: charging a battery unit with power supplied from an external device; and allowing a communication control unit of an electronic device to perform an enumeration process with power supplied from the battery unit if a remaining amount of the battery unit is higher than a predetermined amount.

Further features and aspects of the following embodiments will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the present invention and, together with the description, serve to explain the present invention.

DESCRIPTION OF THE EMBODIMENTS

Exemplary embodiments, features, and aspects of the present invention will be described below with reference to the drawings. However, exemplary embodiments of the present invention are not limited to the following exemplary embodiments.

First Exemplary Embodiment

Figure 1:
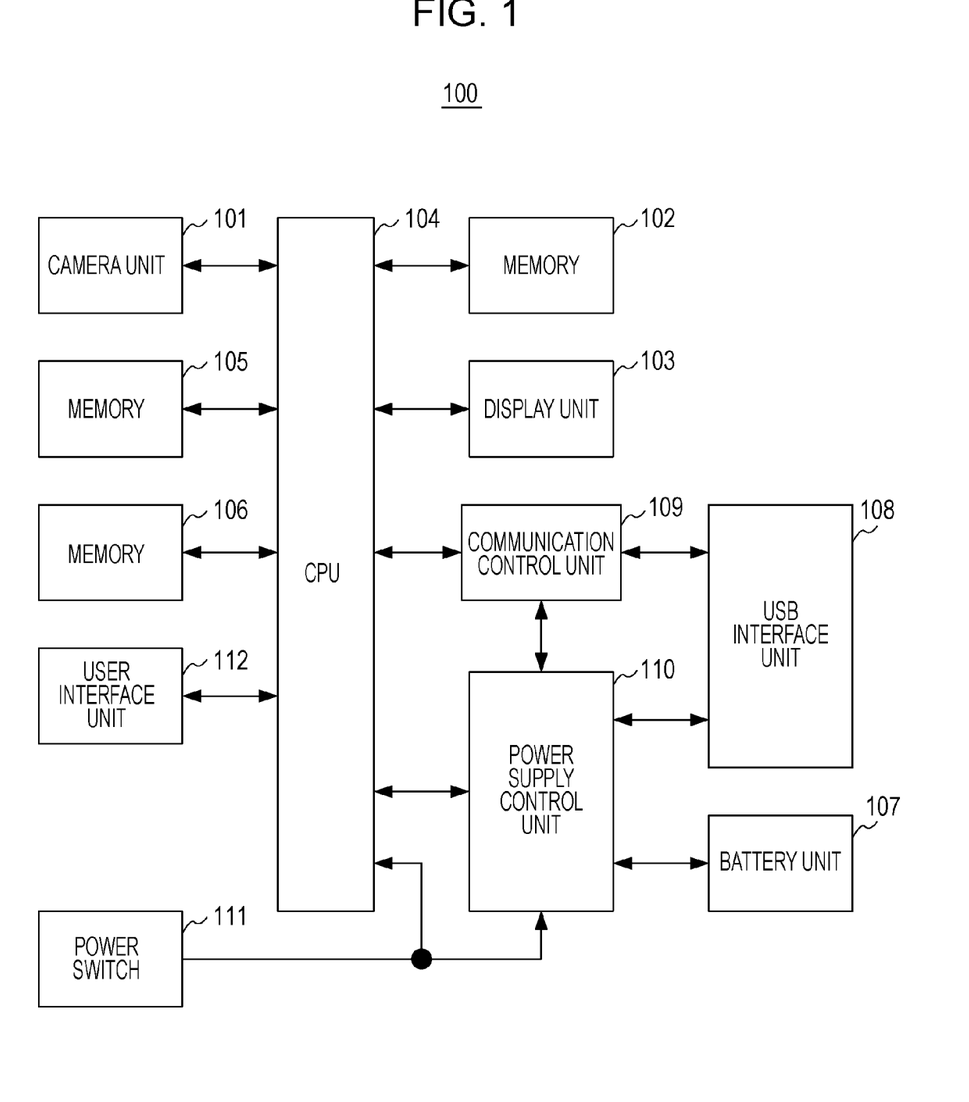
FIG. 1 is a block diagram for explaining components included in an electronic device according to a first exemplary embodiment.

FIG. 1 is a block diagram illustrating components included in an electronic device 100 according to the first exemplary embodiment.

The electronic device 100 may be configured to act as at least one of a digital camera and a digital video camera, for example. However, the electronic device 100 is not limited by such a configuration. For example, the electronic device 100 may be configured to act as a cellar phone. The electronic device 100 is based on a Universal Serial Bus (USB) standard and acts as a USB device.

Referring to FIG. 1, the electronic device 100 includes a camera unit 101, a memory 102, a display unit 103, a central processing unit (CPU) 104, a memory 105, a memory 106, and a battery unit 107. The electronic device 100 further includes a USB interface unit 108, a communication control unit 109, a power supply control unit 110, a power switch 111, and a user interface unit 112.

The camera unit 101 may have a lens, an image capturing device, an image processing circuit, and so on. If an operation mode of the electronic device 100 is a camera mode, the camera unit 101 may generate image data corresponding to an optical image. The image data generated by the camera unit 101 is supplied to the memory 102, the display unit 103 and the communication control unit 109 through the CPU 104. The image data generated by the camera unit 101 may be either still image data or moving image data.

The memory 102 may be configured with a random access memory (RAM), for example. If an operation mode of the electronic device 100 is the camera mode, the CPU 104 may store in the memory 102 image data generated by the camera unit 101. If an operation mode of the electronic device 100 is a reproduction mode, the CPU 104 may read out image data stored in the memory 102 from the memory 102. The image data read from the memory 102 is supplied to the display unit 103 and the communication control unit 109. The memory 102 may be a memory that is removable from the electronic device 100 or a memory within the electronic device 100.

The display unit 103 has a display device configured to display an image. If an operation mode of the electronic device 100 is the camera mode, the display unit 103 may display an image corresponding to image data generated by the camera unit 101. If an operation mode of the electronic device 100 is the reproduction mode, the display unit 103 may display an image corresponding to image data stored in the memory 102.

The CPU 104 may have a microcomputer, for example, and act as a control unit configured to control all components included in the electronic device 100. The memory 105 may store programs to be executed by the CPU 104. The memory 105 may be a non-transitory storage medium. The memory 106 may store various kinds of information to be used in the CPU 104. The memory 106 may be configured with a random access memory (RAM), for example.

The battery unit 107 has at least one chargeable battery. The battery unit 107 may be a battery unit that is removable from the electronic device 100 or a battery unit internally contained in the electronic device 100.

The USB interface unit 108 is an interface unit based on the USB (Universal Serial Bus) standard. The USB interface unit 108 is configured to operate by using at least one of power supplied from the battery unit 107 and power supplied from an external device connected to the USB interface unit 108. Hereinafter, an external device connected to the USB interface unit 108 will be called "external device E0".

The communication control unit 109 is capable of controlling data communication with the external device E0. The communication control unit 109 is capable performing an enumeration process based on the USB standard. The enumeration process is performed between the external device E0 and the communication control unit 109. The communication control unit 109 is capable of determining a type of the external device E0. If an operation mode of the electronic device 100 is the camera mode, the communication control unit 109 may transmit image data generated by the camera unit 101 to the external device E0. If an operation mode of the electronic device 100 is the reproduction mode, the communication control unit 109 may transmit image data stored in the memory 102 to the external device E0. The communication control unit 109 is configured to operate by using at least one of power from the battery unit 107 and power from the external device E0.

The power supply control unit 110 is a control unit configured to control power supplies of the electronic device 100. The power supply control unit 110 is capable of controlling a process of supplying power from the power supplies of the electronic device 100 to all or a part of components included in the electronic device 100. The battery unit 107 is one of the power supplies of the electronic device 100. If the external device E0 is either predetermined AC adapter or predetermined host device, the external device E0 is one of the power supplies of the electronic device 100. In the first exemplary embodiment, a device capable of supplying power from an AC power supply (such as power supply for general home use) to the electronic device 100 via a USB cable will be called "predetermined AC adapter". The predetermined AC adapter according to the first exemplary embodiment may be a device which does not act as a USB host based on the USB standard, or a device having an operation mode in which the device does not act as a USB host based on the USB standard. A USB-AC adapter is an example of the predetermined AC adapter. The USB adapter 110 and the USB adapter 310 disclosed in Japanese Patent Laid-Open No. 2007-68333 are also examples of the predetermined AC adapter. In the first exemplary embodiment, a device capable of acting as a USB host based on the USB standard will be called "predetermined host device". A personal computer is an example of the predetermined host device.

The power supply control unit 110 is capable of receiving power from the battery unit 107 and receiving power from the external device E0. The power supply control unit 110 is capable of acting as a charging unit configured to charge the battery unit 107 with power supplied from the external device E0. The power supply control unit 110 is configured to operate by using at least one of power from the battery unit 107 and power from the external device E0.

The power switch 111 is a switch for instructing the CPU 104 to perform a starting process or a shutdown process. The user interface unit 112 is a user interface unit for inputting various instructions to the electronic device 100. An operation mode selecting switch for selecting an operation mode of the electronic device 100 is included in the user interface unit 112. A shutter button for instructing a process of capturing a still image or a moving image is included in the user interface unit 112.

Next, with reference to FIGS. 1 and 2, there will be described a first charging control process P1 to be performed by the electronic device 100 according to the first exemplary embodiment.

Figure 2:
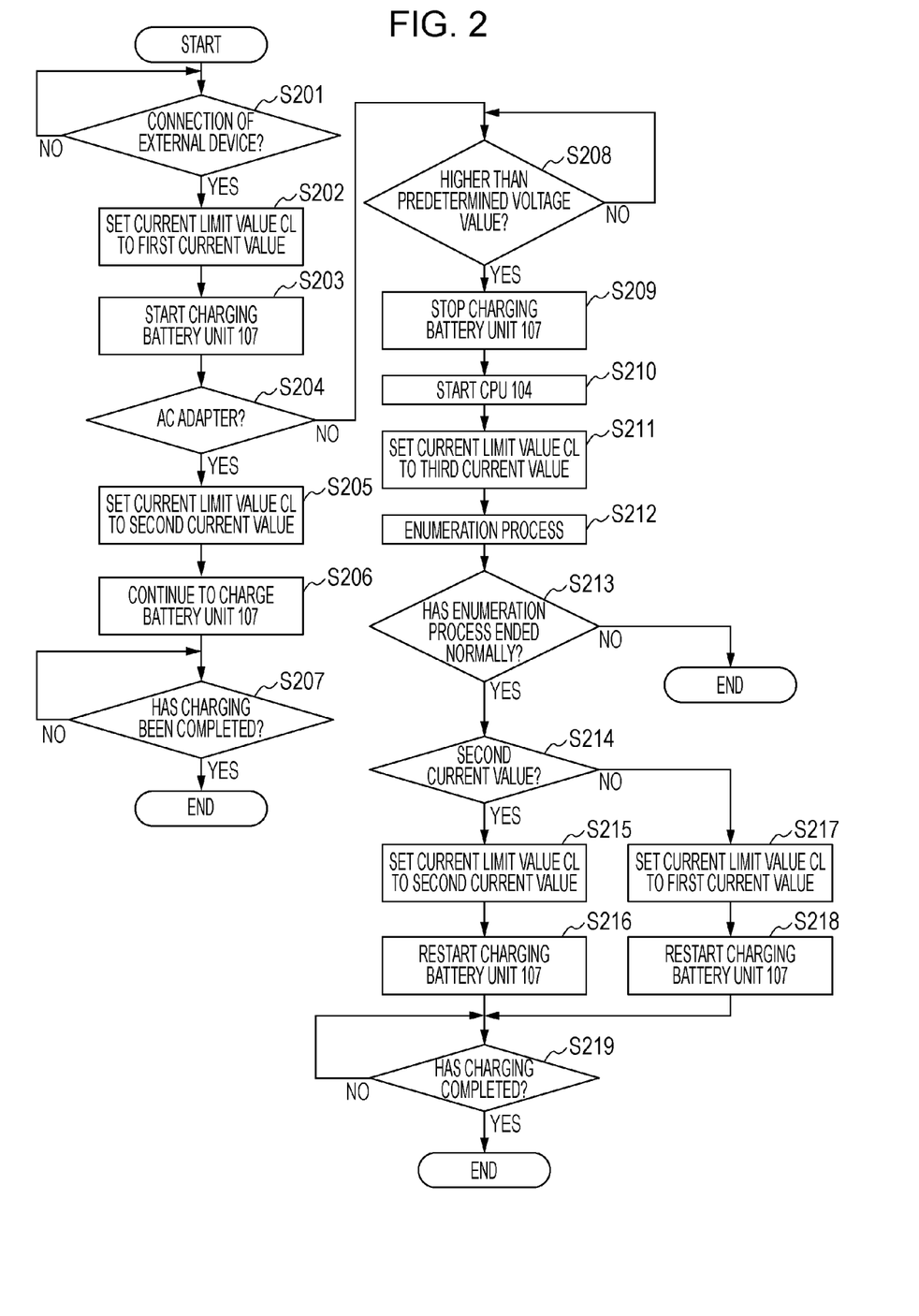
FIG. 2 is a flowchart describing first charging control process which is performed by the electronic device according to the first exemplary embodiment.

FIG. 2 is a flowchart describing the first charging control process P1 to be performed in the electronic device 100 according to the first exemplary embodiment. The first charging control process P1 illustrated in FIG. 2 is started when the electronic device 100 is shut down.

In step S201, the communication control unit 109 uses power from the battery unit 107 to determine whether an external device is connected to the USB interface unit 108 or not. If no external device is connected to the USB interface unit 108, step S201 is resumed after a lapse of a predetermined period of time (NO in step S201). If an external device is connected to the USB interface unit 108, step S202 is started (YES in step S201).

In step S202, the communication control unit 109 instructs the power supply control unit 110 to set a current limit value CL to a first current value. Thus, a limit value for current which can be received by the power supply control unit 110 from the external device E0 via the USB interface unit 108 may be set to the first current value by the power supply control unit 110. According to the first exemplary embodiment, the first current value may be a value equal to or lower than 100 mA. The power supply control unit 110 starts receiving power from the external device E0 after the current limit value CL is set to the first current value.

In step S203, the power supply control unit 110 starts charging the battery unit 107 with power supplied from the external device E0. The power supply control unit 110 starts charging the battery unit 107 with first current value set as the current limit value CL.

In step S204, the communication control unit 109 uses power supplied from the external device E0 to determine whether the external device E0 is the predetermined AC adapter or not. If the external device E0 is the predetermined AC adapter, the step S205 is started (YES in step S204). If the external device E0 is not the predetermined AC adapter, step S208 is started (NO in step S204).

In step S205, the communication control unit 109 instructs the power supply control unit 110 to change the current limit value CL from the first current value to a second current value. Thus, the limit value for current which can be received by the power supply control unit 110 from the external device E0 via the USB interface unit 108 may be changed from the first current value to the second current value by the power supply control unit 110. According to the first exemplary embodiment, the second current value is a value higher than the first current value and may be equal to or lower than 500 mA, for example. After the current limit value CL is changed from the first current value to the second current value, the power supply control unit 110 may charge the battery unit 107 with the second current value set as the current limit value CL. This allows the power supply control unit 110 to complete the charging of the battery unit 107 quicker than the time with the first current value set as the current limit value CL.

In step S206, the power supply control unit 110 continues to charge the battery unit 107 with power supplied from the external device E0. The power supply control unit 110 continues to charge the battery unit 107 with the second current value set as the current limit value CL.

In step S207, the power supply control unit 110 uses power supplied from the external device E0 to determine whether the charging of the battery unit 107 has completed or not. If the charging of the battery unit 107 has not completed, step S207 is resumed after a lapse of a predetermined period of time (NO in step S207). If the charging of the battery unit 107 has completed, the first charging control process P1 ends (YES in step S207). If the external device E0 is disconnected from the USB interface unit 108 while step S207 is repeating, the first charging control process P1 ends.

In step S208, the power supply control unit 110 uses power supplied from the external device E0 to determine whether a voltage value of the battery unit 107 is higher than a predetermined voltage value or not. In the first exemplary embodiment, a voltage value used to determine whether a remaining amount (or an accumulated charge amount) of the battery unit 107 is higher than a predetermined amount A0 or not will be called "predetermined voltage value". The predetermined amount A0 corresponds to a remaining amount (or an accumulated charge amount) enough for starting at least the CPU 104. If a voltage value of the battery unit 107 is equal to or lower than the predetermined voltage value, the power supply control unit 110 determines that a remaining amount (or an accumulated charge amount) of the battery unit 107 is equal to or lower than the predetermined amount A0. If a voltage value of the battery unit 107 is higher than the predetermined voltage value, the power supply control unit 110 determines that a remaining amount (or an accumulated charge amount) of the battery unit 107 is higher than the predetermined amount A0. If a voltage value of the battery unit 107 is equal to or lower than the predetermined voltage value, step S208 is resumed after a lapse of a predetermined period of time (NO in step S208). If a voltage value of the battery unit 107 is equal to or lower than the predetermined voltage value, the power supply control unit 110 continues to charge the battery unit 107 with power supplied from the external device E0. If a voltage value of the battery unit 107 is equal to or lower than the predetermined voltage value, the communication control unit 109 controls to disable an enumeration process between the communication control unit 109 and the external device E0. On the other hand, if a voltage value of the battery unit 107 is higher than the predetermined voltage value, step S209 is started (YES in step S208). If the external device E0 is disconnected from the USB interface unit 108 while step S208 is repeating, the first charging control process P1 ends.

In step S208, the process of determining whether a voltage value of the battery unit 107 is higher than the predetermined voltage value or not may be replaced by a process of determining whether a remaining amount (or an accumulated charge amount) of the battery unit 107 is higher than the predetermined amount A0 or not. In this case, the power supply control unit 110 is capable of calculating a remaining amount (or an accumulated charge amount) of the battery unit 107. If a remaining amount (or an accumulated charge amount) of the battery unit 107 is equal to or lower than the predetermined amount A0, step S208 is resumed after a lapse of a predetermined period of time (NO in step S208). If a remaining amount (or an accumulated charge amount) of the battery unit 107 is equal to or lower than the predetermined amount A0, the power supply control unit 110 continues to charge the battery unit 107 with power supplied from the external device E0. If a remaining amount (or an accumulated charge amount) of the battery unit 107 is equal to or lower than the predetermined amount A0, the communication control unit 109 controls to disable an enumeration process between the communication control unit 109 and the external device E0. On the other hand, if a remaining amount (or an accumulated charge amount) of the battery unit 107 is higher than the predetermined amount A0, step S209 is started (YES in step S208). If the external device E0 is disconnected from the USB interface unit 108 while step S208 is repeating, the first charging control process P1 ends.

In step S209, the power supply control unit 110 stops charging the battery unit 107 in order to perform an enumeration process with power supplied from the battery unit 107.

In step S210, the power supply control unit 110 transmits to the CPU 104 a starting signal for starting the CPU 104. In addition to the transmission of the starting signal to the CPU 104, the power supply control unit 110 starts a process for supplying power from the battery unit 107 to the CPU 104. Thus, the CPU 104 may be started by using power supplied from the battery unit 107. The started CPU 104 transmits to the power supply control unit 110 an instruction for supplying power from the battery unit 107 to the communication control unit 109 and so on. The power supply control unit 110 having received the instruction starts a process for supplying power from the battery unit 107 to the communication control unit 109 and so on. Thus, the communication control unit 109 and so on are supplied with power from the battery unit 107. After power supply from the battery unit 107 to the communication control unit 109 and so on is started, the CPU 104 instructs the communication control unit 109 to start an enumeration process.

According to the first exemplary embodiment, the CPU 104 sets a value of an end voltage to a first end voltage value such that the CPU 104 is disabled to start a shutdown process immediately after the starting of the CPU 104 is started in step S210. In the first exemplary embodiment, a voltage used to determine whether the CPU 104 will start a process for shutting down the electronic device 100 or not will be called "end voltage". The first end voltage value is lower than the predetermined voltage value. The first end voltage value is preferably a voltage value enough for performing a process for restarting charging the battery unit 107 in step S216 or S218. If a voltage value of the battery unit 107 is lower than the first end voltage value, the CPU 104 starts the shutdown process. If a voltage value of the battery unit 107 is not lower than the first end voltage value, the CPU 104 does not start the shutdown process.

In step S211, the communication control unit 109 instructs the power supply control unit 110 to change the current limit value CL from the first current value to a third current value in order to perform an enumeration process with power supplied from the battery unit 107. Thus, the limit value for current which can be received by the power supply control unit 110 from the external device E0 via the USB interface unit 108 may be changed from the first current value to the third current value by the power supply control unit 110. According to the first exemplary embodiment, the third current value is lower than the first current value and the second current value, and may be a value equal to or lower than 2.5 mA.

In step S212, the communication control unit 109 controls to perform an enumeration process between the communication control unit 109 and the external device E0. According to the first exemplary embodiment, the communication control unit 109 performs the enumeration process between the communication control unit 109 and the external device E0 with power supplied from the battery unit 107. By performing the enumeration process, the communication control unit 109 may inform the external device E0 of what kind of device the electronic device 100 is.

In step S213, the communication control unit 109 determines whether the enumeration process has normally ended or not. The communication control unit 109 notifies whether the enumeration process has normally ended or not to the CPU 104. If the enumeration process has normally ended, the CPU 104 determines that the external device E0 is the predetermined host device. If the enumeration process has not ended normally, the CPU 104 determines that the external device E0 is not the predetermined host device. If the enumeration process has normally ended, step S214 is started (YES in step S213). If the enumeration process has not ended normally, the first charging control process P1 ends (NO in step S213).

In step S214, the communication control unit 109 inquires the external device E0 of whether a maximum value of current that can be supplied from the external device E0 to the electronic device 100 is the second current value or not. If a maximum value of current that can be supplied from the external device E0 to the electronic device 100 is the second current value, step S215 is started (YES in step S214). If a maximum value of current that can be supplied from the external device E0 to the electronic device 100 is not the second current value, step S217 is started (NO in step S214).

In step S215, the communication control unit 109 instructs the power supply control unit 110 to change the current limit value CL from the third current value to the second current value. Thus, the limit value for current which can be received by the power supply control unit 110 from the external device E0 via the USB interface unit 108 may be changed from the third current value to the second current value by the power supply control unit 110. After the current limit value CL is changed from the third current value to the second current value, the power supply control unit 110 may charge the battery unit 107 with the second current value set as the current limit value CL. This allows the power supply control unit 110 to complete the charging of the battery unit 107 quicker than the time with the first current value set as the current limit value CL.

In step S216, the power supply control unit 110 restarts charging the battery unit 107 with power supplied from the external device E0. The power supply control unit 110 restarts charging the battery unit 107 with the second current value set as the current limit value CL.

In step S217, the communication control unit 109 instructs the power supply control unit 110 to change the current limit value CL from the third current value to the first current value. Thus, the limit value for current which can be received by the power supply control unit 110 from the external device E0 via the USB interface unit 108 may be changed from the third current value to the first current value by the power supply control unit 110. After the current limit value CL is changed from the third current value to the first current value, the power supply control unit 110 charges the battery unit 107 with the first current value set as the current limit value CL.

In step S218, the power supply control unit 110 restarts charging the battery unit 107 with power supplied from the external device E0. The power supply control unit 110 restarts charging the battery unit 107 with the first current value set as the current limit value CL.

In step S219, the power supply control unit 110 determines whether the charging of the battery unit 107 has completed or not. If the charging of the battery unit 107 has not completed, step S219 is resumed again after a lapse of a predetermined period of time (NO in step S219). If the charging of the battery unit 107 has completed, the first charging control process P1 ends (YES in step S219). If the external device E0 is disconnected from the USB interface unit 108 while step S219 is repeating, the first charging control process P1 ends.

According to the first exemplary embodiment, if it is determined in step S219 that the charging of the battery unit 107 has completed, a value of the end voltage is changed from the first end voltage value to a second end voltage value. According to the first exemplary embodiment, the second end voltage value is a higher value than the first end voltage value and the predetermined voltage value. However, the second end voltage value may be equal to or lower than the predetermined voltage value. The second end voltage value is preferably a voltage value enough for causing the CPU 104 to perform a process for visually or audibly notifying a user of information warning prompt to charge the battery unit 107. The information warning prompt to charge the battery unit 107 may be displayed on the display unit 103 under control of the CPU 104, for example. If a voltage value of the battery unit 107 becomes lower than the second end voltage value after the first charging control process P1 ends, the CPU 104 starts a shutdown process.

In this way, in the first charging control process P1, an enumeration process may be performed with power supplied from the battery unit 107. This may prevent occurrence of the problem that an enumeration process may not be started due to insufficient capability of the external device E0. This may further prevent occurrence of the problem that an enumeration process ends for some load states of the external device E0.

In the first charging control process P1, a type of the external device E0 may be identified early by using power supplied from the external device E0. If the external device E0 is the predetermined AC adapter, the current limit value CL may be changed from the first current value to the second current value, which allows quick completion of the charging of the battery unit 107.

In the first charging control process P1, if the enumeration process ends normally, whether a maximum value of current to be supplied from the external device E0 to the electronic device 100 is the second current value or not may be determined. If a maximum value of current to be supplied from the external device E0 to the electronic device 100 is the second current value, the current limit value CL may be changed from the third current value to the second current value. Thus, the charging of the battery unit 107 may be completed more quickly.

Next, with reference to FIGS. 1, 2 and 3, a second charging control process P2 will be described which is to be performed by the electronic device 100 according to the first exemplary embodiment instead of the first charging control process P1.

Figure 3:
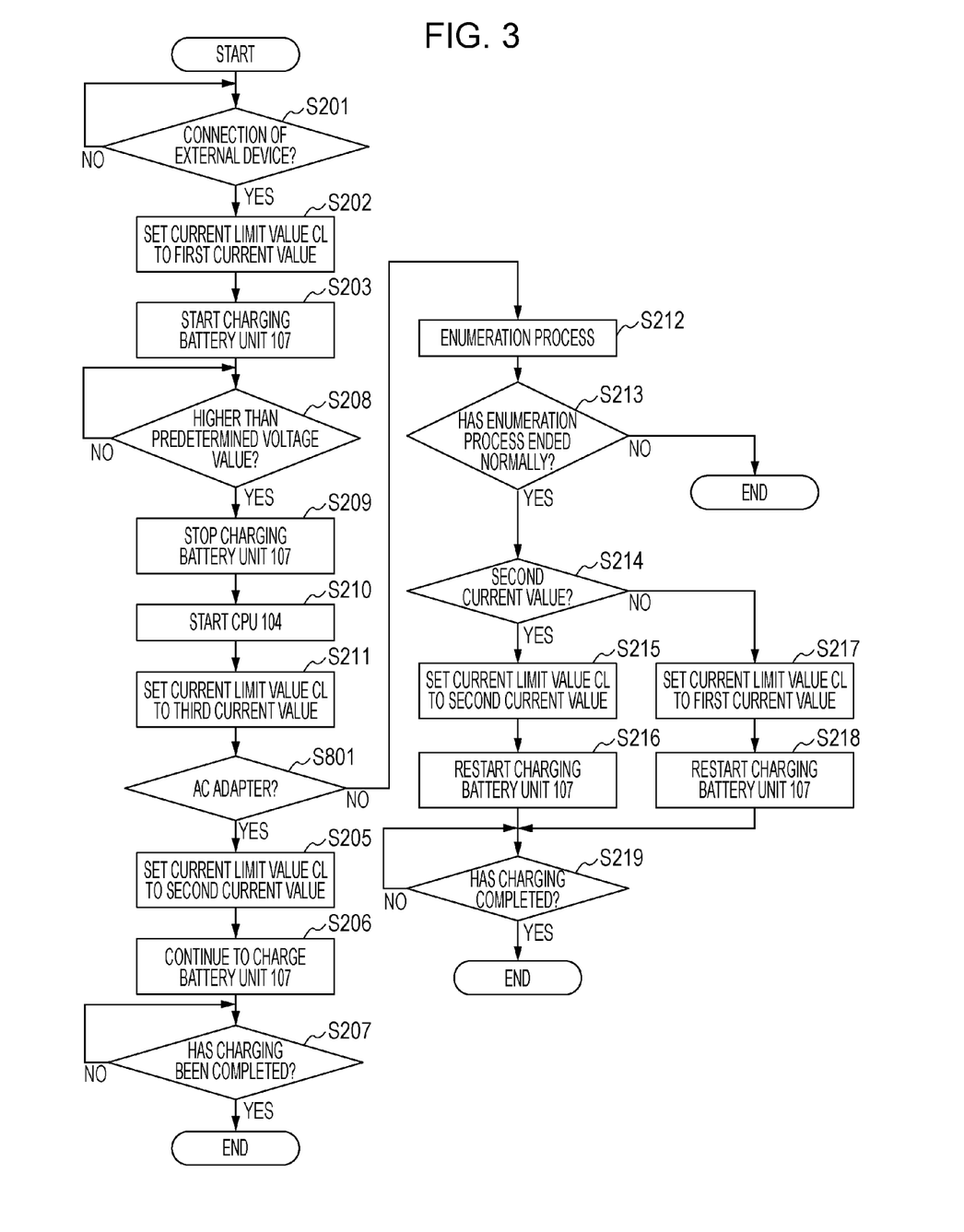
FIG. 3 is a flowchart describing second charging control process which is performed instead of the first charging control process by the electronic device according to the first exemplary embodiment.

FIG. 3 is a flowchart describing the second charging control process P2 to be performed by the electronic device 100 according to the first exemplary embodiment instead of the first charging control process P1. The second charging control process P2 illustrated in FIG. 3 is started when the electronic device 100 is shut down. The same components illustrated in FIG. 3 as the components illustrated in FIG. 2 are referred by the same numbers as given to the components illustrated in FIG. 2, and the repetitive description on the same components illustrated in FIG. 3 as the components illustrated in FIG. 2 will be omitted.

In step S801, the communication control unit 109 uses power supplied from the battery unit 107 instead of the external device E0 to determine whether the external device E0 is the predetermined AC adapter or not. If the external device E0 is the predetermined AC adapter, step S205 is started (YES in step S801). If the external device E0 is not the predetermined AC adapter, step S212 is started (NO in step S801).

In this way, in the second charging control process P2, an enumeration process may be performed with power supplied from the battery unit 107. This may prevent occurrence of the problem that an enumeration process may not be started due to insufficient capability of the external device E0. This may further prevent occurrence of the problem that an enumeration process ends for some load states of the external device E0.

In the second charging control process P2, a type of the external device E0 may be identified by using power supplied from the battery unit 107 instead of the external device E0. If the external device E0 is the predetermined AC adapter, the current limit value CL may be changed from the first current value to the second current value, which allows quick completion of the charging of the battery unit 107.

In the second charging control process P2, if the enumeration process ends normally, whether a maximum value of current to be supplied from the external device E0 to the electronic device 100 is the second current value or not may be determined. If a maximum value of current to be supplied from the external device E0 to the electronic device 100 is the second current value, the current limit value CL may be changed from the third current value to the second current value. Thus, the charging of the battery unit 107 may be completed more quickly.

Next, with reference to FIG. 4, there will be described an example of a configuration of a starting signal generating unit 110A included in the power supply control unit 110 according to the first exemplary embodiment.

Figure 4:
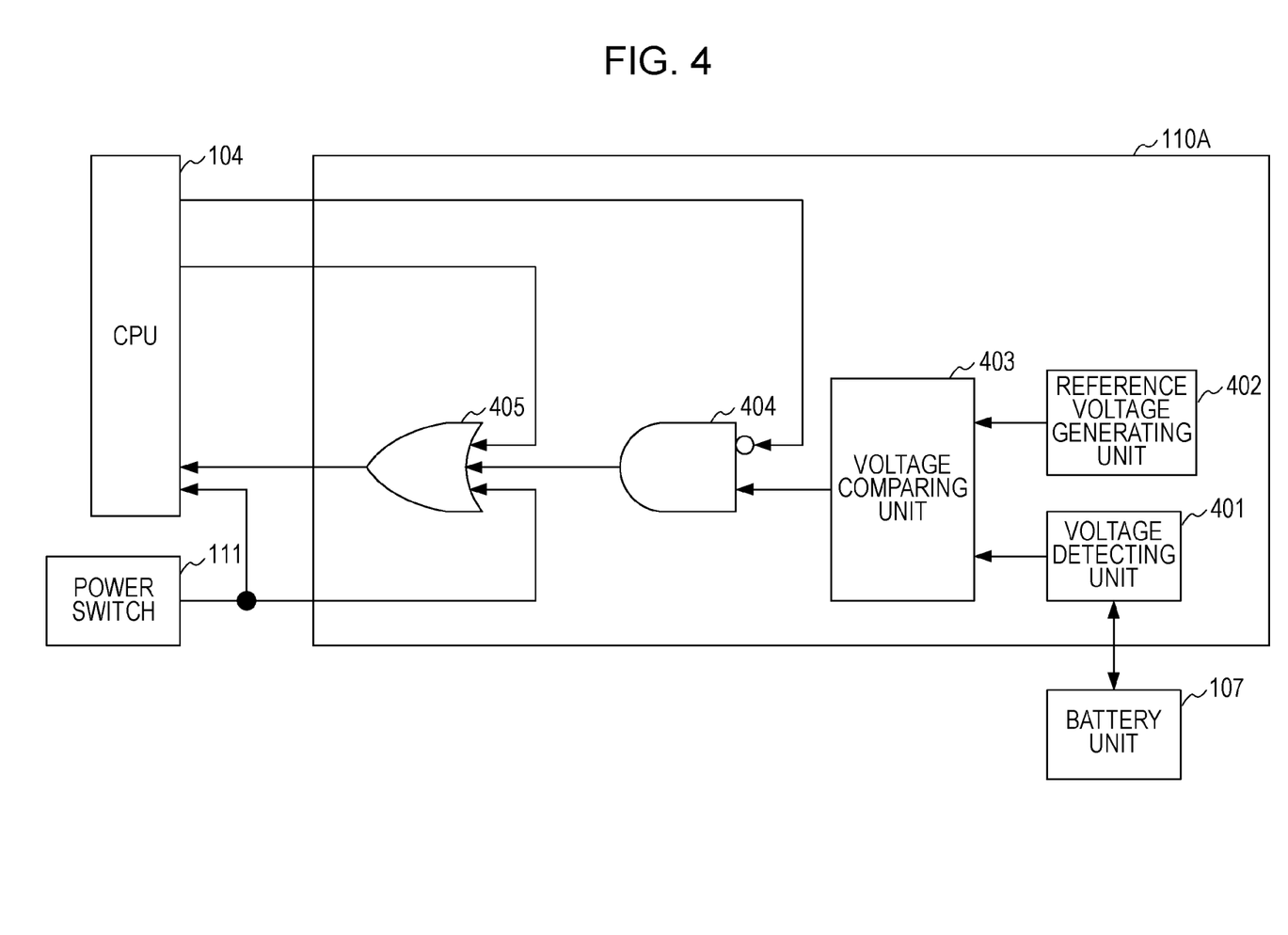
FIG. 4 is a block diagram illustrating an example of a configuration of a starting signal generating unit according to the first exemplary embodiment.

FIG. 4 is a block diagram illustrating an example of a configuration of the starting signal generating unit 110A.

The starting signal generating unit 110A is configured to generate a starting signal for starting the CPU 104. As illustrated in FIG. 4, the starting signal generating unit 110A includes a voltage detecting unit 401, a reference voltage generating unit 402, a voltage comparing unit 403, an AND circuit 404, and a OR circuit 405.

The voltage detecting unit 401 is capable of detecting a voltage value of the battery unit 107. For example, the voltage detecting unit 401 is capable of detecting a voltage value of the battery unit 107 in a period that the power supply control unit 110 uses power supplied from the external device E0 to charge the battery unit 107. The voltage detecting unit 401 transmits a voltage value detected by the voltage detecting unit 401 as battery voltage value information to the CPU 104 and the voltage comparing unit 403.

The reference voltage generating unit 402 is configured to generate reference voltage value information indicating the predetermined voltage value described in step S208. The reference voltage generating unit 402 transmits the reference voltage value information generated by the reference voltage generating unit 402 to the voltage comparing unit 403.

The voltage comparing unit 403 compares the battery voltage value information received from the voltage detecting unit 401 and the reference voltage value information received from the reference voltage generating unit 402 to determine whether a voltage value of the battery unit 107 is higher than the predetermined voltage value or not.

If a voltage value of the battery unit 107 is higher than the predetermined voltage value, voltage comparing unit 403 transmits an H signal to the AND circuit 404. In the first exemplary embodiment, a signal having a value higher than the first voltage value is called "H signal". If a voltage value of the battery unit 107 is equal to or lower than the predetermined voltage value, the voltage comparing unit 403 transmits an L signal to the AND circuit 404. In the first exemplary embodiment, a signal having a value lower than the second voltage value is called "L signal". The second voltage value is lower than the first voltage value.

The AND circuit 404 generates an H signal or an L signal based on a signal received from the voltage comparing unit 403 and a signal received from the CPU 104. In a period that power from the battery unit 107 is supplied to the CPU 104, the CPU 104 transmits an H signal to the AND circuit 404. In the other period, the CPU 104 transmits an L signal to the AND circuit 404. An H signal or an L signal generated in the AND circuit 404 is transmitted to the OR circuit 405.

If the voltage comparing unit 403 transmits an H signal to the AND circuit 404 and the CPU 104 transmits an L signal, the AND circuit 404 transmits an H signal to the OR circuit 405. In other words, if a voltage value of the battery unit 107 is higher than the predetermined voltage value and power from the battery unit 107 is not supplied to the CPU 104, the AND circuit 404 transmits an H signal to the OR circuit 405.

If the voltage comparing unit 403 transmits an H signal to the AND circuit 404 and the CPU 104 transmits an H signal, the AND circuit 404 transmits an L signal to the OR circuit 405.

If the voltage comparing unit 403 transmits an L signal to the AND circuit 404 and the CPU 104 transmits an H signal, the AND circuit 404 transmits an L signal to the OR circuit 405.

If the voltage comparing unit 403 transmits an L signal to the AND circuit 404 and the CPU 104 transmits an L signal, the AND circuit 404 transmits an L signal to the OR circuit 405.

The OR circuit 405 generates an H signal or an L signal based on a signal received from the power switch 111, a signal received from the CPU 104, and a signal received from the AND circuit 404. In a period that the power switch 111 is pressed, the power switch 111 transmits an H signal to the OR circuit 405. In the other period, the power switch 111 transmits an L signal to the OR circuit 405. In a period that the CPU 104 is in operation, the CPU 104 transmits an H signal to the OR circuit 405. In the other period, the CPU 104 transmits an L signal to the OR circuit 405. In a period that a voltage value of the battery unit 107 is higher than a predetermined voltage value but power from the battery unit 107 is not supplied to the CPU 104, the AND circuit 404 transmits an H signal to the OR circuit 405. In the other period, the AND circuit 404 transmits an L signal to the OR circuit 405. An H signal or an L signal generated by the OR circuit 405 is transmitted to the CPU 104.

If at least one of signals received from the power switch 111, the CPU 104 and the AND circuit 404 is an H signal, the OR circuit 405 transmits an H signal as the starting signal to the CPU 104 to start the CPU 104 (see step S210). If the starting signal is transmitted from the OR circuit 405 to the CPU 104, the power supply control unit 110 starts a process for supplying power from the battery unit 107 to the CPU 104. Thus, the CPU 104 having received the starting signal from the OR circuit 405 may be started by using power from the battery unit 107.

If all of signals received from the power switch 111, the CPU 104 and the AND circuit 404 are L signals, the OR circuit 405 transmits an L signal to the CPU 104.

Next, with reference to FIG. 5, there will be described an example of a configuration of a starting signal generation circuit 110B to be used instead of the starting signal generating unit 110A in the power supply control unit 110 according to the first exemplary embodiment.

Figure 5:
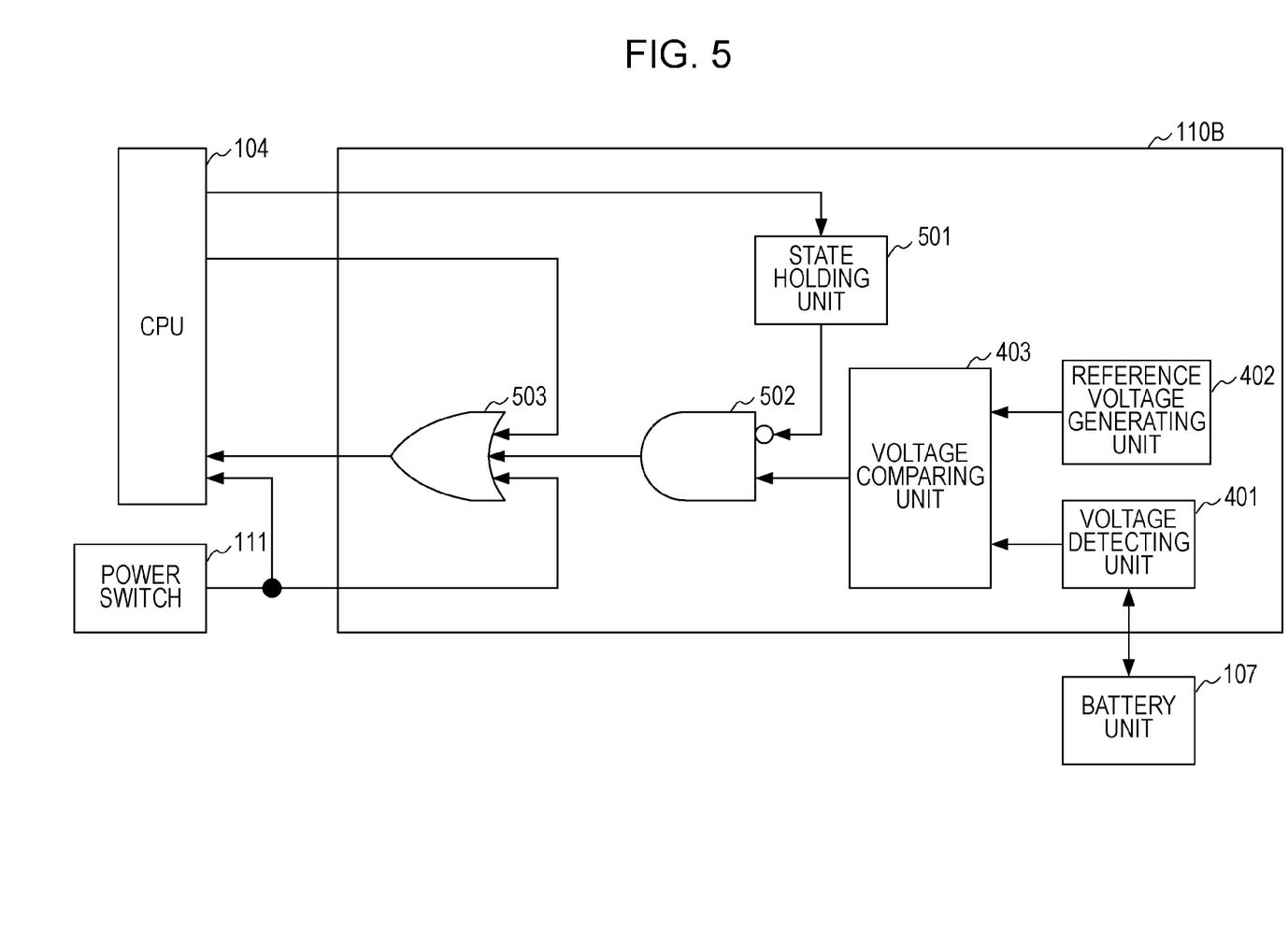
FIG. 5 is a block diagram illustrating another example of a configuration of the starting signal generating unit according to the first exemplary embodiment.

FIG. 5 is a block diagram illustrating an example of a configuration of the starting signal generation circuit 110B. The same components illustrated in FIG. 5 as the components illustrated in FIG. 4 are referred by the same numbers as given to the components illustrated in FIG. 4, and the repetitive description on the same components illustrated in FIG. 5 as the components illustrated in FIG. 4 will be omitted.

The starting signal generation circuit 110B is configured to generate a starting signal for starting the CPU 104. The starting signal generation circuit 110B is different from the starting signal generating unit 110A, and has a state holding unit 501, an AND circuit 502 and an OR circuit 503.

The state holding unit 501 is capable of holding a state of a signal transmitted from the CPU 104 to the state holding unit 501 for a predetermined period of time. Thus, even when the state of a signal transmitted from the CPU 104 to the state holding circuit 501 changes from an H signal to an L signal, the state holding circuit 501 may keep transmitting an H signal to the AND circuit 502 for a predetermined period of time. Even when the state of a signal transmitted from the CPU 104 to the state holding circuit 501 changes from an L signal to an H signal, the state holding circuit 501 may keep transmitting an L signal to the AND circuit 502 for a predetermined period of time. In a period that power from the battery unit 107 is supplied to the CPU 104, the CPU 104 transmits an H signal to the state holding unit 501. In the other period, the CPU 104 transmits an L signal to the state holding unit 501.

The AND circuit 502 generates an H signal or an L signal based on a signal received from the voltage comparing unit 403 and a signal received from the state holding unit 501. An H signal or an L signal generated by the AND circuit 502 is transmitted to the OR circuit 503.

If the voltage comparing unit 403 transmits an H signal to the AND circuit 502 and the state holding unit 501 transmits an L signal, the AND circuit 502 transmits an H signal to the OR circuit 503. In other words, if a voltage value of the battery unit 107 is higher than the predetermined voltage value and the state holding unit 501 transmits an L signal, the AND circuit 404 transmits an H signal to the OR circuit 405.

If the voltage comparing unit 403 transmits an H signal to the AND circuit 502 and the state holding unit 501 transmits an H signal, the AND circuit 502 transmits an L signal to the OR circuit 503.

If the voltage comparing unit 403 transmits an L signal to the AND circuit 502 and the state holding unit 501 transmits an H signal, the AND circuit 502 transmits an L signal to the OR circuit 503.

If the voltage comparing unit 403 transmits an L signal to the AND circuit 502 and the state holding unit 501 transmits an L signal, the AND circuit 502 transmits an L signal to the OR circuit 503.

The OR circuit 503 generates an H signal or an L signal based on a signal received from the power switch 111, a signal received from the CPU 104, and a signal received from the AND circuit 502. In a period that the power switch 111 is pressed, the power switch 111 transmits an H signal to the OR circuit 503. In the other period, the power switch 111 transmits an L signal to the OR circuit 503. In a period that the CPU 104 is in operation, the CPU 104 transmits an H signal to the OR circuit 503. In the other period, the CPU 104 transmits an L signal to the OR circuit 503. In a period that a voltage value of the battery unit 107 is higher than the predetermined voltage value and the state holding unit 501 transmits an L signal, the AND circuit 502 transmits an H signal to the OR circuit 503. In the other period, the AND circuit 502 transmits an L signal to the OR circuit 503. An H signal or an L signal generated by the OR circuit 503 is transmitted to the CPU 104.

If at least one of signals received from the power switch 111, CPU 104 and the AND circuit 502 is an H signal, the OR circuit 503 transmits an H signal as a starting signal to the CPU 104 to start the CPU 104 (see step S210). If a starting signal is transmitted from the OR circuit 503 to the CPU 104, the power supply control unit 110 starts a process for supplying power from the battery unit 107 to the CPU 104. Thus, the CPU 104 having received the starting signal from the OR circuit 503 may be started by using power from the battery unit 107.

If all of signals received from the power switch 111, CPU 104 and AND circuit 502 are L signals, the OR circuit 503 transmits an L signal to the CPU 104.

Second Exemplary Embodiment

Various functions, processes and methods according to the first exemplary embodiment may be implemented by executing a program by a personal computer, microcomputer, a central processing unit (CPU) or the like. In the second exemplary embodiment, a personal computer, a microcomputer, a CPU or the like will be called "computer X". In the second exemplary embodiment, a program for controlling the computer X and for implementing various functions, processes and methods according to the first exemplary embodiment will be called "program Y".

Various functions, processes and methods according to the first exemplary embodiment are implemented by the computer X by executing the program Y. In this case, the program Y is supplied to the computer X through a computer-readable storage medium. A computer-readable storage medium according to the second exemplary embodiment includes at least one of a hard disk drive, an optical disk, a CD-ROM, a CD-R, a memory card, a ROM, a RAM and the like. A computer-readable storage medium according to the second exemplary embodiment is a non-transitory storage medium.

While the present invention has been described with reference to exemplary embodiments, it is to be understood that the present invention is not limited to the exemplary embodiments. The scope of the following claims is to be accorded the broadest interpretation so as to encompass all modifications and equivalent structures.

This application claims priority from Japanese Patent Application No. 2012-287730 filed Dec. 28, 2012, which is hereby incorporated by reference herein in its entirety.

What is claimed is:

1. An electronic device comprising:
a communication control unit configured to perform an enumeration process; and
a charging unit configured to charge a battery unit with power supplied from an external device,
wherein the communication control unit performs the enumeration process with power supplied from the battery unit when a voltage of the battery unit is higher than a predetermined voltage, and
wherein the communication control unit disables the enumeration process when a voltage of the battery unit is not higher than the predetermined voltage.

2. The electronic device according to claim 1, wherein the charging unit continues to charge the battery unit when a voltage of the battery unit is not higher than the predetermined voltage.

3. The electronic device according to claim 1, wherein the communication control unit performs a process for causing the enumeration process to be performed without power from the external device when a voltage of the battery unit is higher than the predetermined voltage.

4. The electronic device according to claim 1, wherein when a voltage of the battery unit is higher than the predetermined voltage and the enumeration process is performed between the external device and the communication control unit, the communication control unit performs a process for changing current to be supplied from the external device to the electronic device.

5. The electronic device according to claim 1, wherein the charging unit stops charging the battery unit when a voltage of the battery unit is higher than the predetermined voltage.

6. The electronic device according to claim 1, wherein the electronic device acts as a USB device.

7. The electronic device according to claim 1, wherein the electronic device acts as a digital camera or a digital video camera.

8. The electronic device according to claim 1, wherein the enumeration process is based on a Universal Serial Bus (USB) standard.

9. A method comprising:
charging a battery unit with power supplied from an external device;
causing a communication control unit of an electronic device to perform an enumeration process with power supplied from the battery unit when a voltage of the battery unit is higher than a predetermined voltage; and
disabling the enumeration process when a voltage of the battery unit is not higher than the predetermined voltage.

10. A non-transitory storage medium that stores a program causing a computer to perform a method, the method comprising:
charging a battery unit with power supplied from an external device;
causing a communication control unit of an electronic device to perform an enumeration process with power supplied from the battery unit when a voltage of the battery unit is higher than a predetermined voltage; and
disabling the enumeration process when a voltage of the battery unit is not higher than the predetermined voltage.

11. An electronic device comprising:
a communication control unit configured to perform an enumeration process; and
a charging unit configured to charge a battery unit with power supplied from an external device,
wherein the communication control unit performs the enumeration process with power supplied from the battery unit when a remaining amount of the battery unit is higher than a predetermined amount, and
wherein the communication control unit disables the enumeration process when a remaining amount of the battery unit is not higher than the predetermined amount.

12. The electronic device according to claim 11, wherein the charging unit continues to charge the battery unit when a remaining amount of the battery unit is not higher than the predetermined amount.

13. The electronic device according to claim 11, wherein the communication control unit performs a process for causing the enumeration process to be performed without power from the external device when a remaining amount of the battery unit is higher than the predetermined amount.

14. The electronic device according to claim 11, wherein when a remaining amount of the battery unit is higher than the predetermined amount and the enumeration process is performed between the external device and the communication control unit, the communication control unit performs a process for changing current to be supplied from the external device to the electronic device.

15. The electronic device according to claim 11, wherein the charging unit stops charging the battery unit when a remaining amount of the battery unit is higher than the predetermined amount.

16. The electronic device according to claim 11, wherein the electronic device acts as a USB device.

17. The electronic device according to claim 11, wherein the electronic device acts as a digital camera or a digital video camera.

18. The electronic device according to claim 11, wherein the enumeration process is based on a Universal Serial Bus (USB) standard.

19. A method comprising:
   charging a battery unit with power supplied from an external device;
   causing a communication control unit of an electronic device to perform an enumeration process with power supplied from the battery unit when a remaining amount of the battery unit is higher than a predetermined amount; and
   disabling the enumeration process when a remaining amount of the battery unit is not higher than the predetermined amount.

20. A non-transitory storage medium that stores a program causing a computer to perform a method, the method comprising:
   charging a battery unit with power supplied from an external device;
   causing a communication control unit of an electronic device to perform an enumeration process with power supplied from the battery unit when a remaining amount of the battery unit is higher than a predetermined amount; and
   disabling the enumeration process when a remaining amount of the battery unit is not higher than the predetermined amount.

* * * * *